United States Patent [19]

Gouhara et al.

[11] Patent Number: 5,584,044

[45] Date of Patent: Dec. 10, 1996

[54] INTEGRATED CIRCUIT MEMORY CARD FOR WRITE IN/READ OUT CAPABILITY HAVING PLURALITY OF LATCHING MEANS FOR EXPANDABLE ADDRESSING USING COUNTING MEANS FOR ENABLING LATCHES THEREOF

[75] Inventors: Kouichi Gouhara; Kaoru Adachi; Kenji Ito; Osamu Saito, all of Tokyo, Japan

[73] Assignee: Fuji Photo Film Co., Ltd., Kanagawa, Japan

[21] Appl. No.: 465,619

[22] Filed: Jun. 5, 1995

Related U.S. Application Data

[63] Continuation of Ser. No. 102,516, Aug. 5, 1993, abandoned, which is a continuation of Ser. No. 728,284, Jul. 11, 1991, abandoned.

[30] Foreign Application Priority Data

| Sep. 28, 1990 | [JP] | Japan | 2-257380 |
| Sep. 28, 1990 | [JP] | Japan | 2-257381 |
| Sep. 28, 1990 | [JP] | Japan | 2-257382 |

[51] Int. Cl.[6] .................................................. G06F 12/00
[52] U.S. Cl. .................. 395/894; 395/846; 395/851; 395/853
[58] Field of Search ........................... 395/800, 823, 395/834, 846, 851, 853, 894; 365/189.01, 189.02

[56] References Cited

U.S. PATENT DOCUMENTS

| 4,402,044 | 8/1983 | McDonough et al. | 395/800 |
| 4,459,664 | 7/1984 | Pottier et al. | 395/375 |
| 4,468,737 | 8/1984 | Bowen | 395/275 |
| 4,502,117 | 2/1985 | Kihara | 395/425 |
| 4,503,491 | 3/1985 | Lushtak et al. | 395/405 |
| 4,694,391 | 9/1987 | Guttag et al. | 395/800 |
| 4,694,394 | 9/1987 | Costantini | 395/800 |
| 4,761,730 | 8/1988 | Ng et al. | 395/425 |
| 4,782,514 | 11/1988 | Oshikata et al. | 379/165 |
| 4,845,662 | 7/1989 | Tokumitsu | 395/425 |
| 4,870,704 | 9/1989 | Matelan et al. | 364/200 |
| 4,888,773 | 12/1989 | Arlington | 364/900 |
| 4,979,144 | 12/1990 | Mizuta | 364/DIG. 2 |
| 4,996,687 | 2/1991 | Hess et al. | 395/425 |
| 5,018,017 | 5/1991 | Sasaki et al. | 348/234 |
| 5,046,180 | 9/1991 | Ueda et al. | 365/189.03 |
| 5,086,407 | 2/1992 | McGarity et al. | 395/800 |
| 5,263,141 | 11/1993 | Sawaki | 395/800 |

*Primary Examiner*—Thomas C. Lee
*Assistant Examiner*—Sang Hui Kim

[57] ABSTRACT

An IC memory card for storing picture data, character data or similar data. The memory card has an input/output section connectable to a host, a storage implemented by a semiconductor memory, and a controller for writing or reading data out of the storage. The input/output section has a data terminal for receiving an address signal and a data signal each being made up of a plurality of blocks continuously, an address/data discrimination terminal for receiving a bilevel signal for discriminating the address signal and data signal fed to the data terminal from each other, a read/write discrimination terminal for receiving a bilevel signal for discriminating the read-out and write-in of data from each other, and a bus clock input terminal for receiving a bus clock synchronous to each block of the address signal or each block of the data signal.

4 Claims, 6 Drawing Sheets

| # | NAME OF TERMINAL |
|---|---|
| 1 | GND |
| 2 | $D_0$ |
| 3 | $D_1$ |
| 4 | $D_2$ |
| 5 | $D_3$ |
| 6 | $D_4$ |
| 7 | $D_5$ |
| 8 | $D_6$ |
| 9 | $D_7$ |
| 10 | Vcc |
| 11 | Vcc/Vpp2 |
| 12 | (RDY/ -BSY) |
| 13 | CE |
| 14 | (A0) -A/D |
| 15 | (A1) R/-W |
| 16 | (RD) BCK |
| 17 | (WR) IDLE |
| 18 | WP |
| 19 | $V_{BAT}$ |
| 20 | GND |

300

INTEGRATED CIRCUIT MEMORY CARD FOR WRITE IN/READ OUT CAPABILITY HAVING PLURALITY OF LATCHING MEANS FOR EXPANDABLE ADDRESSING USING COUNTING MEANS FOR ENABLING LATCHES THEREOF

This application is a continuation of application Ser. No. 08/102,516 filed on Aug. 5, 1993, now abandoned which is a Rule 62 continuation application of Ser. No. 07/728,284, filed on Jul. 11, 1991, which is also abandoned.

BACKGROUND OF THE INVENTION

1. Field of the Invention

The present invention relates to an IC (Integrated Circuit) memory card for storing data such as picture data and character data.

2. Description of the Prior Art

An IC memory card is used with, for example, a digital electronic still camera for the purpose of storing picture data representative of scenes picked up by the camera. While an IC memory card for such an application is often implemented by an SRAM (Static Random Access Memory), recently an EEPROM (Electrically Erasable and Programmable Read Only Memory) is advantageous over an SRAM from a cost standpoint. It is desirable, therefore, that an SRAM and an EEPROM be compatible with each other with respect to the interface in a digital electronic still camera.

Japan Electronics Industry Development Association (JEIDA), for example, has recently proposed an IC Memory Guideline. In the IC Memory Guideline, Third Edition, JEIDA defines a connector having twenty pins. A memory card with an SRAM has eight terminals to input and output data over an 8-bit parallel transfer bus. The eight terminals are used not only to read and write data in the memory chip of the memory card but also to designate the addresses of the memory chip. Therefore, such a memory card has two extra terminals or state terminals for discriminating data and addresses from each other, i.e., the discrimination is made on the basis of the logical states of the state terminals. Specifically, when the address of the memory chip is constituted by a plurality of bytes, the bytes are designated by the combination of the logical states of the two extra terminals.

An IC memory card incorporating an SRAM whose storage capacity is greater than 64 kilobytes, for example, has addresses each being represented by three bytes. It has been customary with this kind of memory card to read the address of the lower byte when both of the two state terminals are in a low level or "L", the address of the medium byte when one of the state terminals is in a low level and the other is in a high level or "H", or the address of the upper byte when their logical states are contrary. Both of the state terminals are in a high level when data is written to the memory card. Further, such an IC memory card needs a read clock terminal for receiving a read timing clock in the event of data read-out and a write clock terminal for receiving a write clock in the event of data write-in.

The memory card with an SRAM has a control circuit therein for controlling the write-in and read-out of data in the memory chip. On receiving an address represented by a plurality of bytes from a host, the control circuit sets up a corresponding address of the memory chip. Thereafter, the control circuit sequentially updates the address of the memory chip in response to a data clock being applied to a clock terminal, thereby reading or writing data in the memory chip. In this manner, in a conventional IC memory card, addresses and data from a host are inputted over a common signal line while a state signal is applied to two state terminals. Clock pulses for reading or writing data in memory chip are also fed from the host to the memory card.

Assuming an IC memory card having a given standardized number of input and output pins such as twenty pins, the memory card cannot be provided with an extra function unless at least one of the pins is omitted. A conventional IC memory card having two state terminals cannot assume more than four different states, inclusive of the data writing state. Hence, when the address has more than three bytes, i.e., when the storage capacity exceeds 64 kilobytes, it is necessary to increase the number of state terminals for receiving a state signal. Consequently, the inputting and outputting system heretofore practiced cannot meet the demand for extra functions and greater storage capacity.

SUMMARY OF THE INVENTION

It is therefore an object of the present invention to provide a data inputting and outputting system for an IC memory card which accommodates extra functions without changing the number of terminals heretofore used, and an IC memory card using the same.

It is another object of the present invention to provide a data inputting and outputting system for an IC memory card which is capable of receiving addresses each having more than three bytes with the compatibility of the connector pin arrangement to the existing IC memory card maintained, and an IC memory card using the same.

In accordance with the present invention, in a data inputting and outputting system for an IC memory card to which an address signal and a data signal each being made up of a plurality blocks are continuously fed from a host over a common signal line, the IC memory card receives from the host control signals which are an address/data discrimination signal for discriminating the address signal and the data signal from each other on the basis of two logical levels, a read/write discrimination signal for discriminating write-in and read-out of data from each other on the basis of two logical levels, and a bus clock synchronous to each of the blocks of the address signal and data signal. In response to the control signals, the IC memory card identifies the address signal on a block basis, identifies the write-in or the read-out of data, or receives data to be written to thereby write or read data.

Also, in accordance with the present invention, an IC memory card has an input/output section connectable to a host, a storage implemented by a semiconductor memory, and a controller for writing or reading data out of the storage. The input/output section has a data terminal for receiving an address signal and a data signal each being made up of a plurality of blocks continuously, an address/data discrimination terminal for receiving a bilevel signal for discriminating the address signal and data signal fed to the data terminal from each other, a read/write discrimination terminal for receiving a bilevel signal for discriminating the read-out and write-in of data from each other, and a bus clock input terminal for receiving a bus clock synchronous to each block of the address signal or each block of the data signal.

Further, in accordance with the present invention, an IC memory card has an input/output section connectable to a host for receiving data from the host and sending data to the host, a storage having a storage area for storing data, and a controller for receiving control signals from the host and, in response to the control signals, writing the data in the storage or reading data out of the storage to send it to the host via the input/output section. An addressing section receives an address designating the storage area serially on a word basis from the host and develops the word of the address to designate a corresponding memory location of the storage area. A fixed data generating section generates fixed data associated with a storage capacity particular to the storage. The controller reads, when commanded to read out the fixed data by the host, the fixed data out of the fixed data generating section and transfers it to the host via the input/output section.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
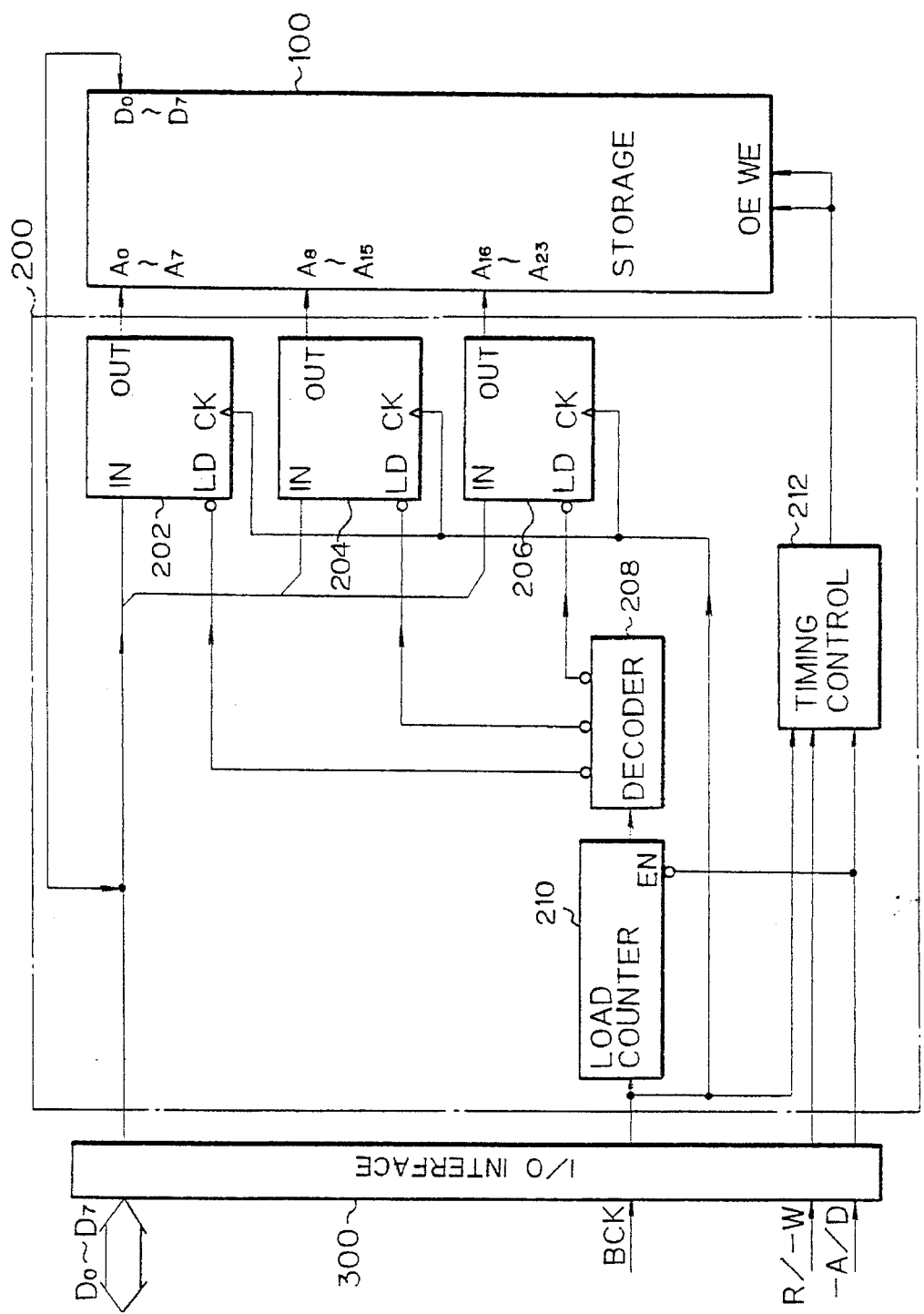
FIG. 1 is a block diagram schematically showing an IC memory card embodying the present invention.

Referring to FIG. 1 of the drawings, an IC memory card embodying the present invention is shown. As shown, the IC memory card is generally made up of a storage 100 implemented by a semiconductor memory, a controller 200 for controlling the write-in and read-out of data to and from the storage 100, and an input/output (I/O) interface 300 connectable to an electronic still camera, personal computer or similar host.

The storage 100 is constituted by a semiconductor memory such as an EEPROM or an SRAM and has twenty-four bits of address terminals A0–A7, A8–A15, and A16–A23, eight bits of data terminals D0–D7, an output enable terminal OE, and a write enable terminal WE. The storage 100 is adapted to have a memory location in and out of which data is written and read in response to an address which is applied to the address terminals A0–A23. The data is written or read via the data terminals D0–D7 one byte at a time. The write-in and the read-out are respectively enabled when the write enable terminal WE is in an ON state and when the output terminal OE is in an ON state.

The controller 200 has three latches 202, 204 and 206 for latching an address signal, a decoder 208 for driving the latches 202–206, a load counter 210 for feeding the count of a bus clock BCK to the decoder 208, and a timing control 212 for delivering enable signals to the storage 100.

The latches 202–206 each is implemented as an 8-bit address counter and receives the bus clock BCK at a clock input terminal CK thereof. Clocked by the bus clock BCK, the latches 202–206 each latches an address signal applied to an input terminal IN thereof via the I/O interface 300. Each of the latches 202–206 transfers to the storage 100 an address signal latched when a load terminal LD thereof changes from an OFF state to an ON state. The latch 202 latches the upper eight bits of an address signal and transfers them to the address terminals A0–A7 of the storage 100. The latch 204 latches the medium eight bits of an address signal and transfers them to the address terminals A8–A15 of the storage 100. Further, the latch 206 latches the lower eight bits of an address signal and transfers them to the address terminals A16–A23 of the storage 100.

The decoder 208 decodes the count of the bus clock BCK fed thereto from the load counter 210 so as to generate a signal for selectively enabling the load terminals LD of the latches 202–206. The load counter 210 counts the bus clock BCK while feeding the count to the decoder 208. The decoder 208 and load counter 210 constitute in combination latch enabling means for enabling the latches 202–206. Specifically, when the bus clock BCK is applied to the load counter 210 for the first time, the decoder 208 decodes the count and feeds a signal for enabling the latch 202. Thereafter, the decoder 208 generates a signal for enabling the latch 204 in response to the second bus clock BCK and then a signal for enabling the latch 206 in response to the third bus clock BCK.

The timing control 212 receives an address/data discrimination signal -A/D for discriminating address signals and data signals from each other, a read/write discrimination signal R/-W for discriminating the write-in and read/out of data, and the bus clock BCK. In response, the timing control 212 turns on either one of the output enable terminal OE and write enable terminal WE of the storage 100, causing the storage 100 to write or read data thereoutof.

Figures 2, 3:
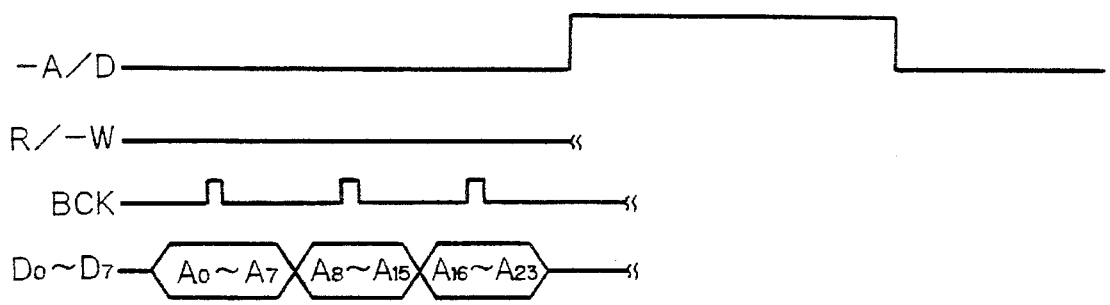
FIG. 2 shows a specific arrangement of terminals in an input/output section included in the embodiment.
FIG. 3 is a timing chart demonstrating a data inputting and outputting procedure particular to the embodiment.

In the illustrative embodiment, the I/O interface 300 is capable of being comprised of a 20-pin I/O bus interface shown in FIG. 2 and proposed by JEIDA in IC Memory Card Guideline, Third Edition. As shown in FIG. 2, the I/O bus interface has two ground terminals GND #1 and #20, data terminals (D0–D7) #2–#9, a common power source (Vcc) terminal #10, a program power source (Vcc/Vpp) terminal #11, a busy signal (RDY/-BSY) terminal #12, a chip enable (CE) terminal #13, state terminals (A0 and A1) #14 and #15, a read clock signal (RD) terminal #16, a write clock signal (WR) terminal #17, a write inhibit terminal (WP) #18, and a battery (VBAT) terminal #19. In the embodiment, the state terminal (A0) #14 plays the role of an address/data discrimination (-A/D) terminal to which a bilevel signal is applied for discriminating an address signal and a data signal from each other. The state terminal (A1) #15 serves as a read/write (R/-W) terminal to which a bilevel signal is applied for discriminating the write-in and read-out of data from each other. Further, the read clock signal (RD) terminal #16 serves as a bus clock (BCK) terminal to which the bus clock BCK synchronous with the bytes of an address signal and those of a data signal is applied. In the illustrative embodiment, the terminal #17 is an idle or spare terminal and accommodates an extra function, as needed. While various kinds of extra functions may be contemplated, they are not relevant to the crux of the embodiment and will not be described herein.

A reference will be made to FIG. 3 for describing a specific operation of the IC memory card having the above construction and how data is inputted to and outputted from the card.

The operator connects the I/O interface 300 of the IC memory card to an electronic still camera or similar host processor and then operates the host in a predetermined manner. In a write mode operation, an address signal designating a memory location of the storage 100 is applied to the data terminals D0–D7 of the storage 100 one byte at a time, i.e., three consecutive bytes in total. At this instant, the address/data discrimination signal -A/D and read/write discrimination signal which are the control signals fed from the host to the terminal #14 and #15, respectively, are in a low level. These discrimination signals are fed to the timing control 212 via the I/O interface 300. The address/data discrimination signal -A/D is inverted and then applied to the load counter 210. In this condition, the timing control 212 and load counter 210 wait for the bus clock BCK. Then, the host sends an address signal representative of upper eight bits and the first bus clock BCK to the memory card. In response, the latches 202–206 each latches the address signal of upper eight bits fed thereto via the I/O interface 300, in synchronism with the first bus clock BCK. The load counter 210 counts the first bus clock BCK and delivers the count to the decoder 208. Decoding the count, the decoder 208 generates an enable signal for turning on the load terminal LD of the first latch 202. As a result, the latch 202 transfers the address value of the latched upper eight bits to the address terminals A0–A7 of the storage 100.

Subsequently, the host sends the medium eight bits of the address to the memory card together with the second bus clock BCK. Then, the latches 202–206 latch the address signal of medium eight bits therein. The load counter 210 having received the second bus clock BCK increments the count and delivers the resulted count to the decoder 208. On receiving the count, the decoder 208 decodes it and then enables the load terminal LD of the second latch 204. As a result, the second latch 204 transfers the address signal of the latched medium eight bits to the address terminals A8–A15 of the storage 100. As the host sends an address signal of lower eight bits to the memory card together with the third bus clock BCK, the address signal is latched by the third latch 206 and transferred to the address terminals A16–A23 of the storage 100.

The host having accessed the memory location of the storage 100 as stated above sends one byte of data to the data terminals D0–D7 of the storage 100. At this instant, the host sends a signal for changing the address/data identification terminal -A/D from a low level to a high level to the memory card. In response, the timing control 212 turns on the write enable terminal WE of the storage 100 to allow data to be written to the storage 100. As a result the data having been applied to the data terminals D0–D7 is written into the storage 100 at the particular location designated by the previously stated twenty-four bits.

In a read mode operation, twenty-four bits of data are read out of the storage 100 and are transferred to D0–D7 of the interface 300 in the same manner as in the write mode operation. Consequently, the output enable terminal OE is turned on to read data out of a designated memory location.

As stated above, the embodiment feeds control signals to the terminals #14–#16 of the interface 300 to write and read data out of a designated memory location and has the terminal #17 as an idle or spare terminal. Further, when the storage capacity of the storage 100 is increased to allow more than three bytes of address signals to designate a memory location, the illustrative embodiment can input and output address signals and data only if the number of latches is increased in matching relation to the number of bytes, i.e., without increasing the number of terminals of the I/O interface 300.

Figure 4:
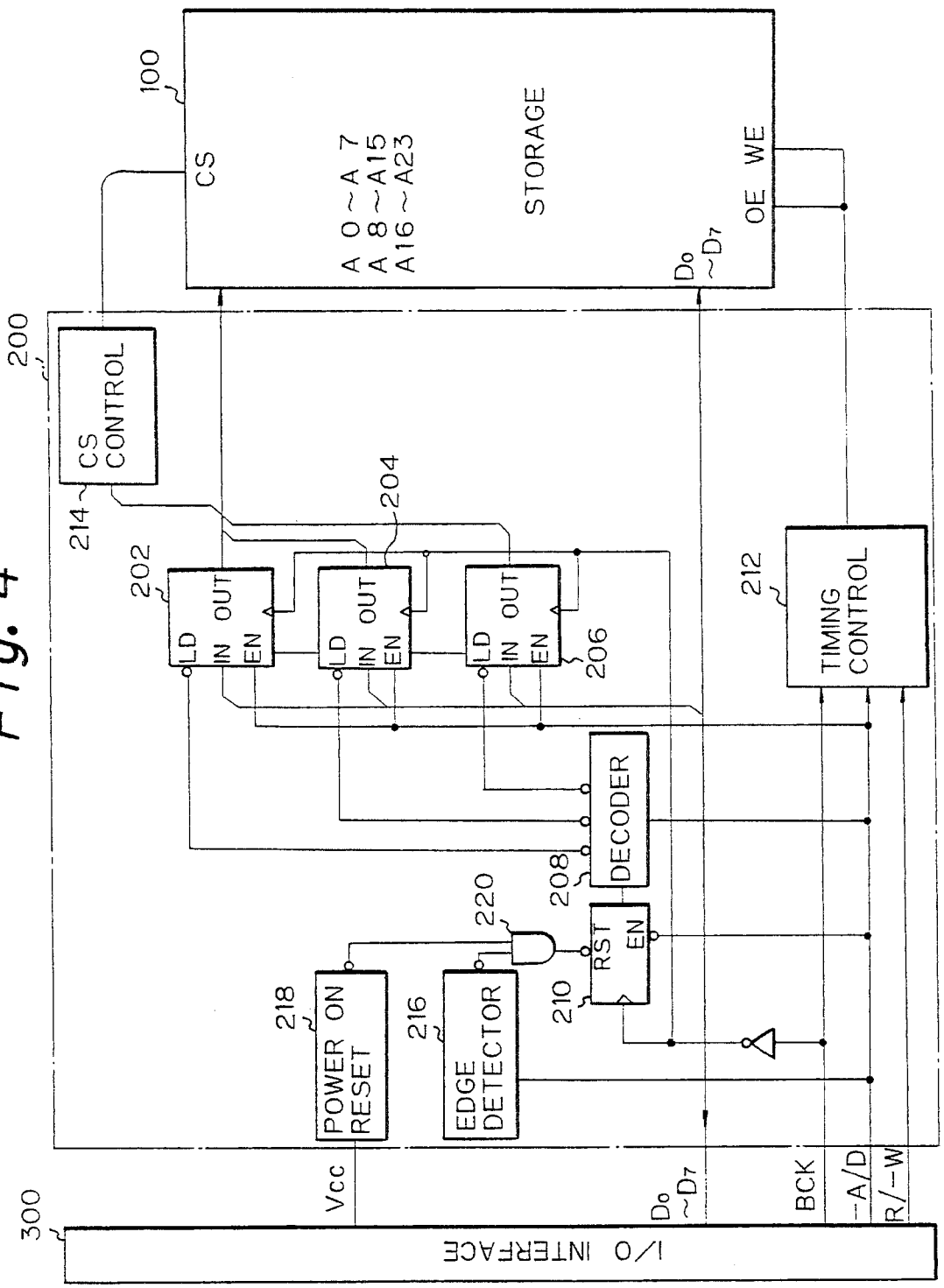
FIG. 4 is a block diagram schematically showing an alternative embodiment of the present invention.

Referring to FIG. 4, an alternative embodiment of the present invention is shown in a schematic block diagram. In the figures, the same or similar components are designated by the same reference numerals, and redundant description will be avoided for simplicity. One of major differences of this embodiment from the previous embodiment is that the storage 100 is made up of a plurality of memory chips while the controller has a chip selection (CS) control 214 for selecting particular one of the memory chips. Another major difference is that this embodiment has an edge detector 216 and a power ON reset circuit 218 for resetting the load counter 210 accurately.

Specifically, the storage 100 has a plurality of chip enable terminals CS each being assigned to respective one of the memory chips. When any one of the chip select terminals CS is turned on, the memory chip associated with that chip select terminal CS is rendered accessible. The chip selection control 214 reads an address signal fed thereto from any of the latches 202–206 to determine which of the plurality of memory chips should be accessed. The chip select control 214 feeds a selection sign&l to the chip enable terminal CS assigned to the memory chip which should be accessed.

The edge detector 216 is a pulse generating circuit which generates, on detecting the positive-going edge of the address/data discrimination signal -A/D, a signal for resetting the load counter 210. Likewise, the power ON reset circuit 218 is a pulse generating circuit for resetting the load counter 210 when the power source is turned on. The outputs of the edge detector 216 and power ON reset circuit 218 are routed through an OR gate 220 to the reset terminal RST of the load counter 210. Stated another way, when the host processor on which the IC memory card is mounted is turned on, the power ON reset circuit 218 is enabled by the common power source Vcc fed from the host. In response, the power ON reset circuit 218 feeds a reset signal to the load counter 210 via the OR gate 220. As a result, the load counter 210 is cleared, i.e., initialized to make the subsequent operations accurate. The edge detector 216 resets the load counter 210 when detected the positive-going edge of the address/data discrimination signal -A/D, i.e., when determined that the feed of address signals has ended and a data signal will be fed. The load counter 210, therefore, can count the bus clock BCK accurately when it reads the next address signal.

Figure 5:
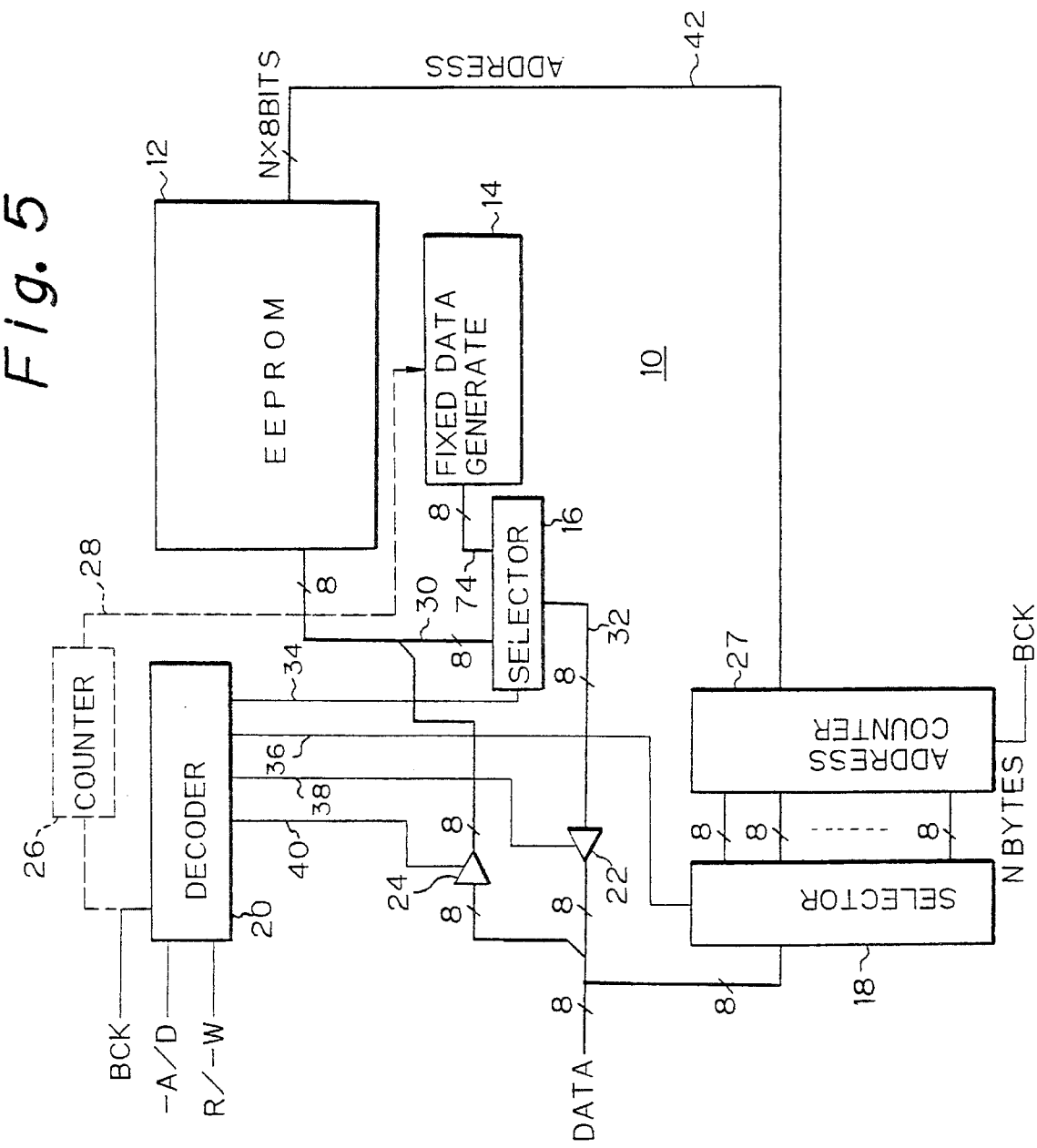
FIG. 5 is a block diagram schematically showing another alternative embodiment of the present invention.

FIG. 5 shows another alternative embodiment of the IC memory card in accordance with the present invention. In this embodiment, the memory card, generally 10, has a fixed data generating section 14 for informing the host of data particular to a storage or EEPROM chip 12, e.g., the storage capacity of the EEPROM 12. This embodiment, therefore, can deal with even an address constituted by more than three bytes.

In FIG. 5, the memory card 10 has a 20-pin I/O bus interface as proposed by JEIDA in IC Memory Card Guideline, Third Edition. The EEPROM chip 12 has an address space which can be designated by an address of N (natural number) bytes. The I/O bus interface of the memory card 10 includes terminals DATA, R/-W, -A/D and BCK, as in the previous embodiments. These terminals are connectable to an electronic still camera, personal computer or similar processor, not shown. The memory card writes data sent from the host in response to a bus clock BCK in the memory locations of the addresses of the EEPROM 12 also sent from the host. The terminal DATA is an 8-bit I/O terminal assigned to address signals and data signals and is connected to the bus of the host. The terminal R/-W indicates whether a bus DATA is in a state for outputting data from the memory card 10 or a state for inputting data to the memory card 10. The terminal -A/D is an input port for discriminating data and address which may be sent over the bus DATA from each other. In this embodiment, the ports E/-W and -A/D show that the signal on the bus DATA is the input of an address when their logical levels both are "L", that the signal is the output of fixed data 50 (FIG. 8) which will be described when their logical levels are "H" and "L", that the signal is the input of data when their logical levels are "L" and "H", or that the signal is the output of data when their logical levels both are "H".

Figure 9:
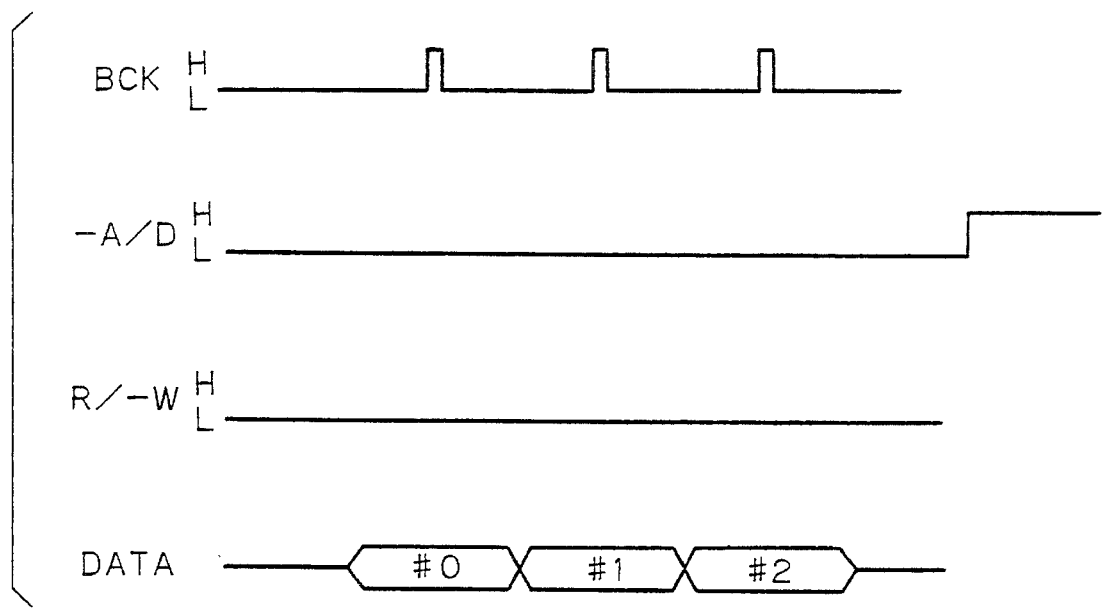
FIG. 9 is a timing chart showing a specific procedure for designating an address particular to the embodiment of FIG. 5.

In this embodiment, the effective address space of the EEPROM 12 is designated by N words, e.g., an address having N bytes. The host sends the address having N bytes serially over the bus DATA. Which of the N bytes of the address is being transferred over the bus DATA is determined on the basis of the number of bus clock pulses BCK, as shown in FIG. 9. Specifically, FIG. 9 demonstrates how three bytes #0, #1 and #2 of an address are serially fed from the host to the bus DATA in synchronism with the bus clock BCK. In this condition, the logical levels of the terminals R/-W and -A/D are "L". The terminals R/-W and -A/D indicate that the data applied to the terminal DATA is the data to be written to the EEPROM 12 when their logical levels are "H" and "L", respectively. While the memory card 10 has other various terminals such as a chip enable terminal, power source terminal, ground terminal and write inhibit terminal, they are not relevant to the crux of the present invention and will not be shown or described.

The IC memory card 10 basically has selectors 16 and 18, a decoder 20, buffer amplifiers 22 and 24, and au address counter 27 in addition to the EEPROM 12 and fixed data generating section 14. In FIG. 5, bold lines are representative of 8-bit parallel transfer lines. Such components of the memory card 10 are mounted on a single flat card-like support. The fixed data generating section 14 generates data particular to the memory card 10, i.e., fixed data 50 and is implemented as a wiring logic circuit or a ROM. The fixed data 50 includes capacity data D1 and D2 indicative of the storage capacity of the EEPROM 12. The capacity data D1 and D2 may take the form of data directly representative of a storage capacity or a code representative of the type or kind of the EEPROM 12, as desired. The access speed particular to the EEPROM 12 may also be included in the fixed data 50.

Figure 7:
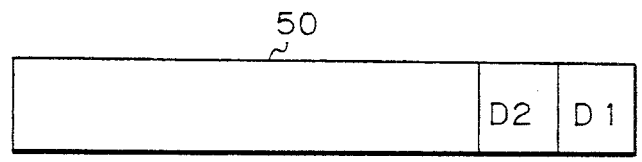
FIG. 7 shows a specific format of fixed data generated by the fixed data generating section.

FIG. 7 shows a specific format of the fixed data 50. As shown, the fixed data 50 has one byte, and the lowermost two bits D1 and D2 thereof are representative of the storage capacity of the EEPROM 12. For example, the capacity data D1 and D2 indicate that the storage capacity of the EEPROM 12 is 256 bytes, 64 kilobytes, 16 megabytes and 4 gigabytes when their logical levels are "L" and "L", "H" and "L", "L" and "H", and "H" and "H", respectively. While such fixed information may be generated by wiring logic or ROM, the 1-byte fixed data 50 or similar fixed data having a relatively small number of bits may advantageously be implemented by wiring logic. It is to be noted that when the storage capacity of the EEPROM 12 is 256 bytes, 64 kilobytes, 16 megabytes or 4 gigabytes, the address designating the memory location of the EEPROM 12 will have one byte, two bytes, three bytes or four bytes.

Figure 6:
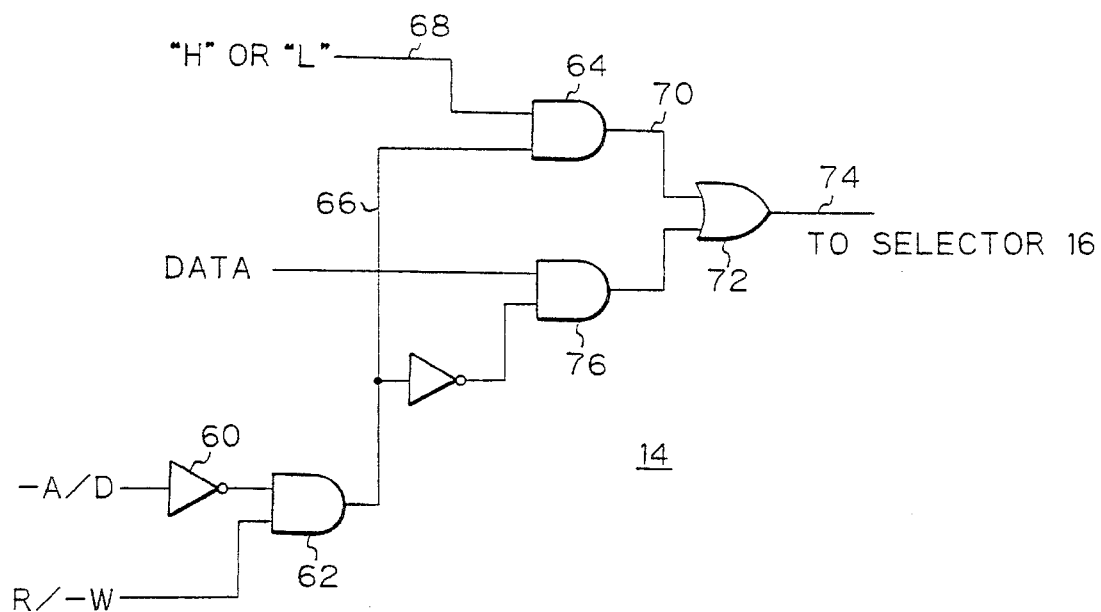
FIG. 6 is a circuit diagram showing a specific construction of a fixed data generating section included in the embodiment of FIG. 5.

Referring to FIG. 6, a specific construction of the fixed data generating section 14 is shown which is implemented as a wiring logic circuit for generating one bit of fixed data. In the circuitry 14 shown in FIG. 6, when the logical levels of the ports R/-W and -A/D are respectively "H" and "L", the read-out of fixed data 50 is commanded. Then, an AND Sate 62 is enabled via an inverter 60 to in turn enable one input 66 of an AND gate 64. The logical level of the other input 68 of the AND gate 64 appears on the output 70 of the gate 64 and is routed through an OR gate 72 and an output terminal 74 to the selector 16, FIG. 5. When the logical levels of the ports R/-W and -A/D are not "H" and "L", only an AND gate 76 is enabled with the result that the logical level of one component of the bus DATA, i.e., DATA- is fed to the selector 16 via the OR gate 72. The fixed data generating section 14 has the same number of such circuits as the number of bits constituting the fixed data. When a plurality of bytes of fixed data are desired, the fixed data generating section 14 may advantageously be implemented by a ROM. In such a case, a counter 26 for counting the bus clock BCK is additionally incorporated in the memory card 10, as indicated by a phantom line in FIG. 5. The output or count of the counter 26 designates the address of interest of the fixed data generating section or ROM 14. In response, the ROM 14 produces the fixed data 50 on the output 74 thereof byte by byte.

The selector 16 selects either one of the output 74 of the fixed data generating section 14 and the output 30 of the EEPROM 12 under the control of the decoder 20. The output 32 of the selector 16 is connected to the bus DATA via the buffer amplifier 22. The decoder 20 decodes the logical states of the ports R/-W and -A/D and controls control lines 34, 36 and 38 in synchronism with the bus clock BCK, thereby controlling the selectors 16 and 18 and buffer amplifiers 22 and 24. Control lines extending from the decoder 20 to the EEPROM 12 and other components of the memory card 10 are not shown for simplicity. The selector 18 connected to the bus DATA selects a particular byte step of the address counter 27 on the basis of the byte of an address which is sent from the host to the bus DATA for designating the memory location of the EEPROM 12. The address counter 27 designates the memory location address of the EEPROM 12 via an address line 42. In the illustrative embodiment, the address counter 27 has storage positions corresponding to N bytes and is incremented in synchronism with the negative-going edges of the bus clock BCK.

Figure 8:
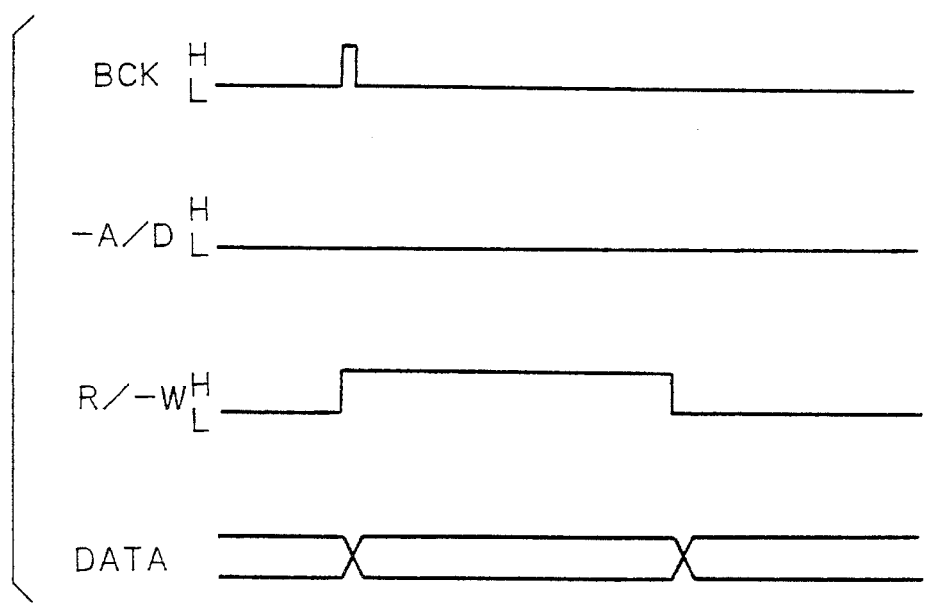
FIG. 8 is a timing chart representative of a specific procedure for reading out the fixed data.

In a write mode operation, a host, not shown, to which the memory card 10 is connected can see the storage capacity of the EEPROM 12 by changing the logical states of the terminals -A/D and R/-W to "L" and "H", respectively, as shown in FIG. 8. The decoder 20 of the memory card 10 develops the states of the terminals -A/D and R/-W in response to the logical states set up by the host. If the logical levels of the terminals -A/D and R/-W are respectively "L" and "H", the decoder 20 turns on the control line 34 at the negative-going edge of the bus clock BCK to cause the selector 16 to connect the input 74 thereof to the output 32. At the same time, the decoder 20 drives the buffer amplifier 22 via the control line 38. As a result, the fixed data 50 is read out of the fixed data generating section 14 and fed to the bus DATA. The host determines the storage capacity of the EEPROM 12 by reading the bits D1 and D2 of the fixed data 50. Therefore, the host sees the length of an address necessary for the address space of the EEPROM 12 to be designted, i.e., the number of bytes which should be transferred as an address. Assuming that the bits D1 and D2 of the fixed data 50 are respectively representative of "L" and "H", then the host sees that the storage capacity of the EEPROM 12 is 64 kilobytes and, therefore, sends an address having three bytes to the bus DATA.

As shown in FIG. 9, the host changes both of the logical levels of the terminals -A/D and R/-W to "L" and then sends the leading address of the memory location of the EEPROM 12 where data should be written over the bus DATA. In the example shown in FIG. 9, the address has three bytes #0, #1, and #2 which are sequentially sent in this order. At the same time, the host feeds the bus clock BCK to the memory card 10.

In the memory card 10, the decoder 20 develops the logical state "L" of the terminals -A/D and R/-W and turns on the control line 36 in response to the negative-going edge of the first bus clock BCK. As a result, the selector 16 connects the input DATA thereof to the first digit output, so that the first byte #0 of the address is set in the first byte step of the address counter 27. Likewise, the decoder 20 selects the second digit output of the selector 16 in response to the negative-going edge of the next bus clock BCK with the result that the second byte #1 of the address is set in the second byte step of the address counter 27. The third byte #2 of the address is set in the third byte step of the address counter 27 in the same manner. By such a procedure, the leading address of the memory location of the EEPROM 12 where data should be written is set in the counter.

Subsequently, the host changes the logical levels of the terminals -A/D and R/-W to "H" and "L", respectively, and then sends one byte of data to be written to the memory card 10 over the bus DATA. The decoder 20 develops the logical levels "H" and "L" of the terminals -A/D and R/-W and turns on the control line 40 in response to the negative-going edge of the first bus clock BCK, thereby driving the buffer amplifier 24. As a result, the data on the bus DATA is written to the memory location of the address indicated by the address counter 27. The address counter 27 is incremented in response to the next bus clock BCK. In this manner, the host can write data sequentially in the EEPROM 12 of the memory card 10.

In the illustrative embodiment, the host can read the fixed data 50 generated by the fixed data generating section 14 and including the storage capacity of the EEPROM 12 before writing data in the memory card 10. The host can also read the fixed data 50 when it reads data out of the memory card 10. In a read mode operation, the decoder 20 develops the logical state "H" of the terminals -A/D and R/-W and controls the control lines 34 and 36 at the negative-going edge of the bus clock BCK. This connects the selector 16 to the input 30 in place of the input 74 and drives the buffer amplifier 22. As a result, data read out of the EEPROM 12 is sent to the host via the selector 16, buffer amplifier 22, and bus DATA.

As stated above, the host can see the size of the address space available with the memory card 10 before reading and writing data in the memory card 10. The storage capacity of the memory card 10 connectable to the host is indefinite. In the illustrative embodiment, capacity data representative of the storage capacity particular to the memory card 10 is generated by the fixed data generating section 14 as the fixed data 50. Theoretically, an infinite address space is available with the memory card 10 depending on the design. In this embodiment, the host can see the address space particular to the memory card 10 and, therefore, the length of an address necessary for the address space to be designated. This is also true when the fixed data generating section 14 is implemented by a ROM. Specifically, when the fixed data has a plurality of bytes, the host generates a plurality of bus clock pulses BCK matching the number of bytes of the fixed data. The counter 26 incorporated in the memory card 10 counts the bus clock BCK to designate the address of the memory location of the ROM 14. As a result, the fixed data is serially read out of the ROM 14 byte by byte and sent to the bus via the selector 16, buffer amplifier 22, and bus DATA.

As shown in FIG. 9, in this embodiment, the lower to the upper bytes of the address designating a particular memory location of the EEPROM 12 are sequentially overwritten in the corresponding byte steps of the address counter 27 in the above-mentioned order. Hence, the host may rewrite one or more lower bytes of an address and send them to the address counter 27 and bus DATA, while preserving the existing upper byte in the address counter 27. This allows the host to access the desired part of the address space of the EEPROM 12 cyclically.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An integrated circuit memory card, comprising:

an input/output section connectable to a host;

semiconductor storage means for storing data coupled thereto from said host, and having a write-in enable terminal and read/out enable terminal; and a write-in/read-out controller for controlling the writing in or reading data out of said storage means having a write-in enable terminal and a read-out enable terminal;

said input/output section being further comprised of;

a plurality of address/data terminals connected to a common address/data bus for alternatively receiving a respective plurality of address signals or a respective plurality of data signals each being made up of a plurality of discrete serial signal blocks, an address/data discrimination terminal for receiving a bilevel logic signal comprising an address/data discriminating control signal having a first signal level for discriminating said address signals and a second signal level for discriminating said data signals fed to said address/data terminals, a read/write discrimination terminal for receiving a bilevel logic signal comprising a read/write discriminating control signal having a first signal level for discriminating a read-out of data from said storage means and a second level for discriminating a write-in of data from said storage means, and a bus clock input terminal for receiving a respective bus clock signal for initiating transmission of each said block of said address signals or each said block of said data signals, said controller being further comprised of;

a plurality of latch means coupled between said storage means and said address/data terminals for latching a respective predetermined block of said signal blocks of said address signals fed to said address/data terminals and, upon being enabled, transferring said predetermined block of address signals to said memory;

latch enabling means responsive to a sequence of bus clock signals for selectively enabling said plurality of latch means when said first signal level of a said address signal is fed to said address/data discrimination terminal and a said bus clock signal is fed to said bus clock input terminal, said enabling means including counting circuit means for counting a sequence of said bus clock signals and generating at least one enabling signal for said latch means and being reset by a signal indicating a transition between said first and second levels of said bilevel signal; and timing control means having an output commonly coupled to said write-in enable terminal and said read-out enable terminal and being responsive to the logic level of said address/data discriminating control signal, the logic level of said read/write discrimination control signal and said bus clock signal for generating and feeding at least one storage control signal to said storage means for turning on either the write-in enable terminal or the read-out enable terminal, whereupon said storage means selectively loads said address signals into the storage means and thereafter writes data in coupled thereto from said common bus and thereafter reads data out of said storage means to said common eight terminal bus in response to said storage control signal.

2. The memory card in accordance with claim 1 wherein said at least one storage control signal includes a data write-in enable signal and a data read-out enable signal.

3. An integrated circuit memory card, comprising:

an input/output section connectable to a host;

a storage comprising a semiconductor memory having address input terminals, data input/output terminals, a write-in enable terminal, and a read-out enable terminal, and having storage locations in which data is to be stored when addressed by an address signal, the data input/output terminals being interconnected to a common bus; and a write-in/read-out controller connected to the write-in and read-out enable terminals and the address input terminals of said storage for providing the address signal to the address input terminals when enabling the write-in and read-out enable terminals to write data in or reading data out of the storage locations of said storage via the common bus;

said input/output section further comprising:

a plurality of address data terminals interconnected to the common bus and said controller and connectable to the host for alternatively receiving the address signal from the host or transferring a data signal between the host and the common bus, each of the address and data signals being made up of at least one discrete block of consecutive bits;

an address/data discrimination terminal connectable to the host and connected to said controller for receiving from the host a bilevel address/data discriminating signal having a first signal level signifying the address signal is being fed to the plurality of address/data terminals and a second signal level signifying that the data signal is being fed to the plurality of address/data terminals;

a read/write discrimination terminal connectable to the host and connected to said controller for receiving from the host a bilevel read/write discrimination signal having one of the first and second signal levels controlling a read-out of data from said storage and the other of the first and second signal levels controlling a write-in of data to said storage; and a bus clock input terminal connectable to the host and connected to said controller for receiving from the host a bus clock signal synchronously initiating transmission of the common bus of the block of the address signal or block of the data signal;

said write-in/read-out controller further comprising:

a plurality of latch means coupled between said storage and said address/data terminals for latching a respective discrete block of said address signals fed to said address/data terminals and, upon being enabled, transferring said discrete blocks of address signals to said storage;

latch enabling means responsive to a sequence of synchronous bus clock signals for selectively enabling said plurality of latch means when said first signal level of said address signal is fed to said address/data discrimination terminal and a said bus clock signal is synchronously fed to said bus clock input terminal, said latch enabling means including counting circuit means for counting a sequence of said bus clock signals and generating at least one enabling signal for said latch means and being reset by a signal indicating a transition between said first and second levels of said bilevel signal fed to said address/data discrimination terminal; and timing control means responsive to said address/data discriminating signal, said read/write discrimination signal and said bus clock signal for generating and feeding a storage control signal to said storage, whereupon said storage alternatively loads said address signals, upon being latched, into the storage and writes data in or reads data out of said storage in response to the said storage control signal generated in accordance with signal levels of said discrimination signals.

4. The memory card in accordance with claim 3 wherein said counting circuit means includes circuit means for being reset by a reset signal which is generated by said circuit means on the turn-on of a power source for powering said system.

* * * * *